United States Patent
Smith (10) Patent No.: US 6,663,139 B1
(45) Date of Patent: *Dec. 16, 2003

(54) COLLAPSIBLE HANDCART

(76) Inventor: Edward J. Smith, 6107 Skyview Dr., Missoula, MT (US) 59803

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,087

(22) Filed: Nov. 5, 1999

(51) Int. Cl.$^7$ ................................................. B62B 9/00
(52) U.S. Cl. .................... 280/651; 280/79.3; 280/79.11
(58) Field of Search ........................ 280/79.3, 79.11, 280/651

(56) References Cited

U.S. PATENT DOCUMENTS

| | | | | |
|---|---|---|---|---|
| 3,827,573 A | * | 8/1974 | Guerette | 211/149 |
| 3,840,243 A | * | 10/1974 | Rheinhart et al. | 280/36 R |
| 3,893,686 A |   | 7/1975 | Morgan | |
| 4,062,556 A | * | 12/1977 | Evans | 280/79.2 |
| 4,326,731 A |   | 4/1982 | Woychio et al. | |
| 4,523,768 A | * | 6/1985 | Dlubala | 280/42 |
| 4,765,646 A | * | 8/1988 | Cheng | 280/651 |
| 4,856,810 A |   | 8/1989 | Smith | |
| 4,878,682 A |   | 11/1989 | Lee | |
| 4,887,836 A |   | 12/1989 | Simjian | |
| 5,480,187 A | * | 1/1996 | Binning | 280/79.2 |
| 5,605,344 A | * | 2/1997 | Insalaco et al. | 280/47.34 |
| 5,738,365 A | * | 4/1998 | McCarthy | 280/651 |
| 5,876,050 A | * | 3/1999 | Berger | 280/79.2 |

* cited by examiner

Primary Examiner—Kenneth R. Rice
Assistant Examiner—Christopher Buchanan
(74) Attorney, Agent, or Firm—Saliwanchik, Lloyd & Saliwanchik (57) ABSTRACT

A collapsible cart folds onto itself to provide a convenient, space saving method for transporting bulk goods. The cart has a floor panel and side panels. Each side panel is pivotally attached to two other side panels and the floor panel is pivotally attached to one of the side panels. To collapse the cart, the floor panel is pivoted up and toward the side panel to which it is attached. Opposing side panels are then pulled together causing the sides to offset and the cart to collapse.

16 Claims, 7 Drawing Sheets

COLLAPSIBLE HANDCART

BACKGROUND OF THE INVENTION

Over one million workers suffer back injuries each year, three out of four of these injuries occur while an employee is lifting (Bureau of Labor Statistics, 1993). Factors that contribute to the risk of injury while lifting include the weight of the object being lifted, the frequency of lifts, duration of the lifting activity, and variables which are individual to the one lifting such as age, sex, body size, state of health and general physical fitness.

With increasing fuel and labor costs and skyrocketing health care costs, back injury prevention is a must to keep a business profitable. Back injury reduction programs instituted for tasks such as manual material handling, when faithfully executed, can significantly reduce the number of back injuries reported on the job. Successful back injury reduction programs combine administrative and engineering controls. Administrative controls include educational programs which teach proper lifting techniques and physical conditioning programs. Engineering controls include improving truck load patterns to position the heaviest loads at optimum lifting positions, equipping trucks with ramps and pull-out shelves and requiring the use of portable handtrucks.

The use of portable handcarts reduces the frequency and duration of lifts. A number of small or loose items can be put into a cart, wheeled to their destination and then unloaded saving many trips to and from the delivery truck. Although the benefits of using a handcart are apparent, these carts are often cumbersome, awkward to deploy and occupy valuable load space in the truck. Collapsible handtrucks can be folded to reduce their size for storage in a nearly full truck. Folding carts have been described that are two sided (U.S. Pat. No. 4,326,731), three-sided (U.S. Pat. No. 3,893,686) or low wagons (U.S. Pat. Nos. 4,856,810, 4,878,682 and 4,887,836). Each cart described serves a specific purpose but most suffer from one or more of the disadvantages listed above. Therefore, new, convenient collapsible carts that are lightweight, easy to deploy and take little storage space are always in demand.

SUMMARY OF THE INVENTION

The subject invention provides a collapsible cart for transporting bulk goods. In an open position, the cart has vertical side panels and a horizontal floor panel. Each side panel is pivotally attached to two other side panels and the floor panel is pivotally attached to one of the side panels. When the cart is not loaded, it can be folded for storage by pivoting the floor panel toward the side panel to which it is attached and collapsing opposing sides of the cart onto one another.

DETAILED DESCRIPTION OF THE INVENTION

The subject invention provides a cart which is collapsible to minimize the space needed for storage. The cart is sturdy, lightweight and easily deployed to an open position by separating its side panels and dropping the floor panel into place.

Figure 1:
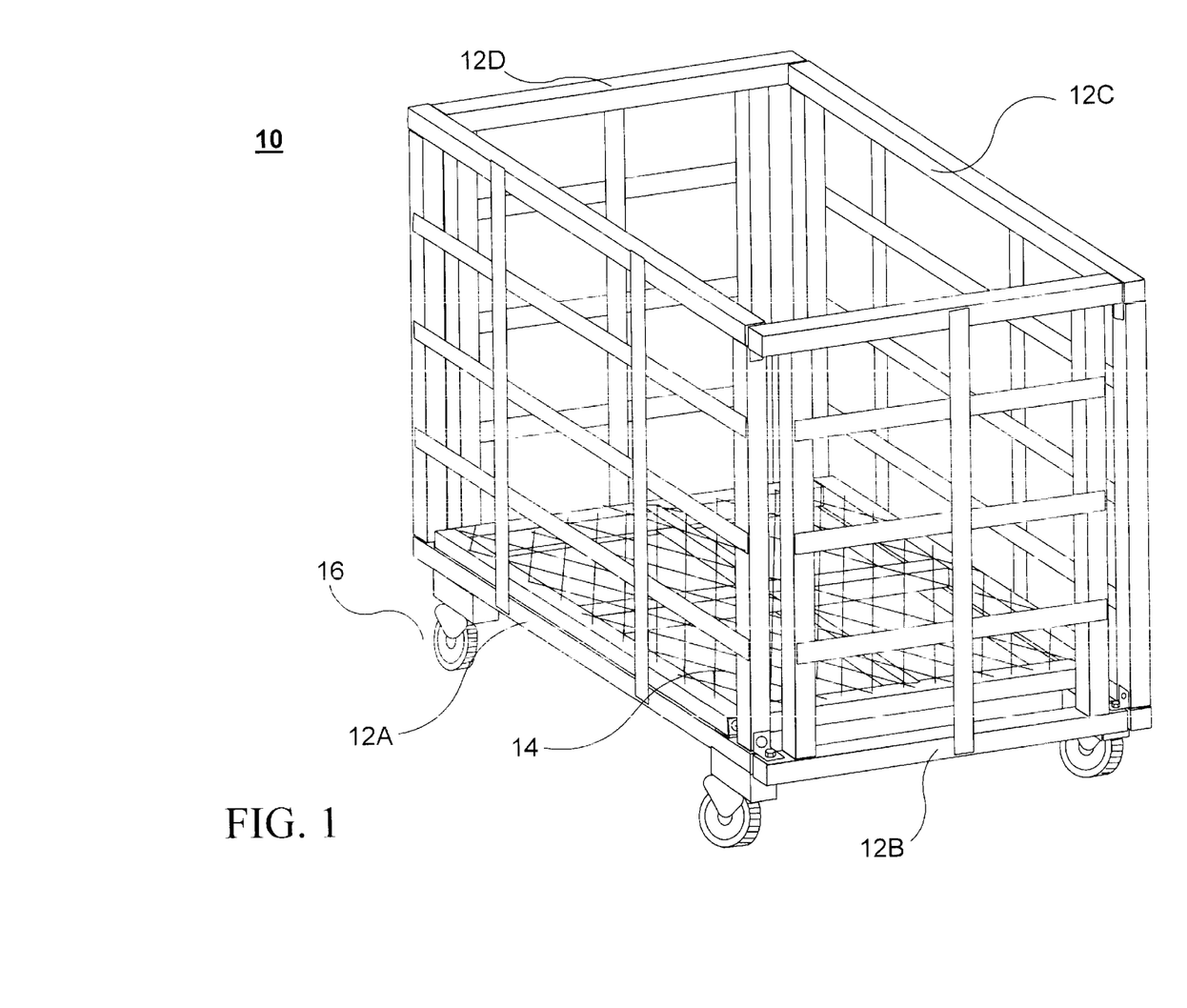
FIG. 1 is a perspective view of a preferred embodiment of the collapsible cart of the subject invention.

The collapsible cart of the subject invention is shown in a preferred embodiment generally at. 10 in FIG. 1. The open cart has vertical side panels 12 and a floor panel 14. Each side panel is pivotally attached to two other side panels. The floor panel 14 is pivotally attached to one side panel 12. The collapsible cart optionally has wheels 16.

A particularly preferred embodiment of the cart of the subject invention is shown in FIGS. 1–8. In this embodiment, the cart 10 has four side panels 12a–d forming a four-sided rectangular box in the open position. The exemplified cart has long side panels 12a and 12c and short side panels 12b and 12d. Each side panel is pivotally attached to two other side panels. For example, side panel 12a is pivotally attached to side panels 12b and 12d. The floor panel 14 is pivotally attached to side panel 12a.

Figure 2:
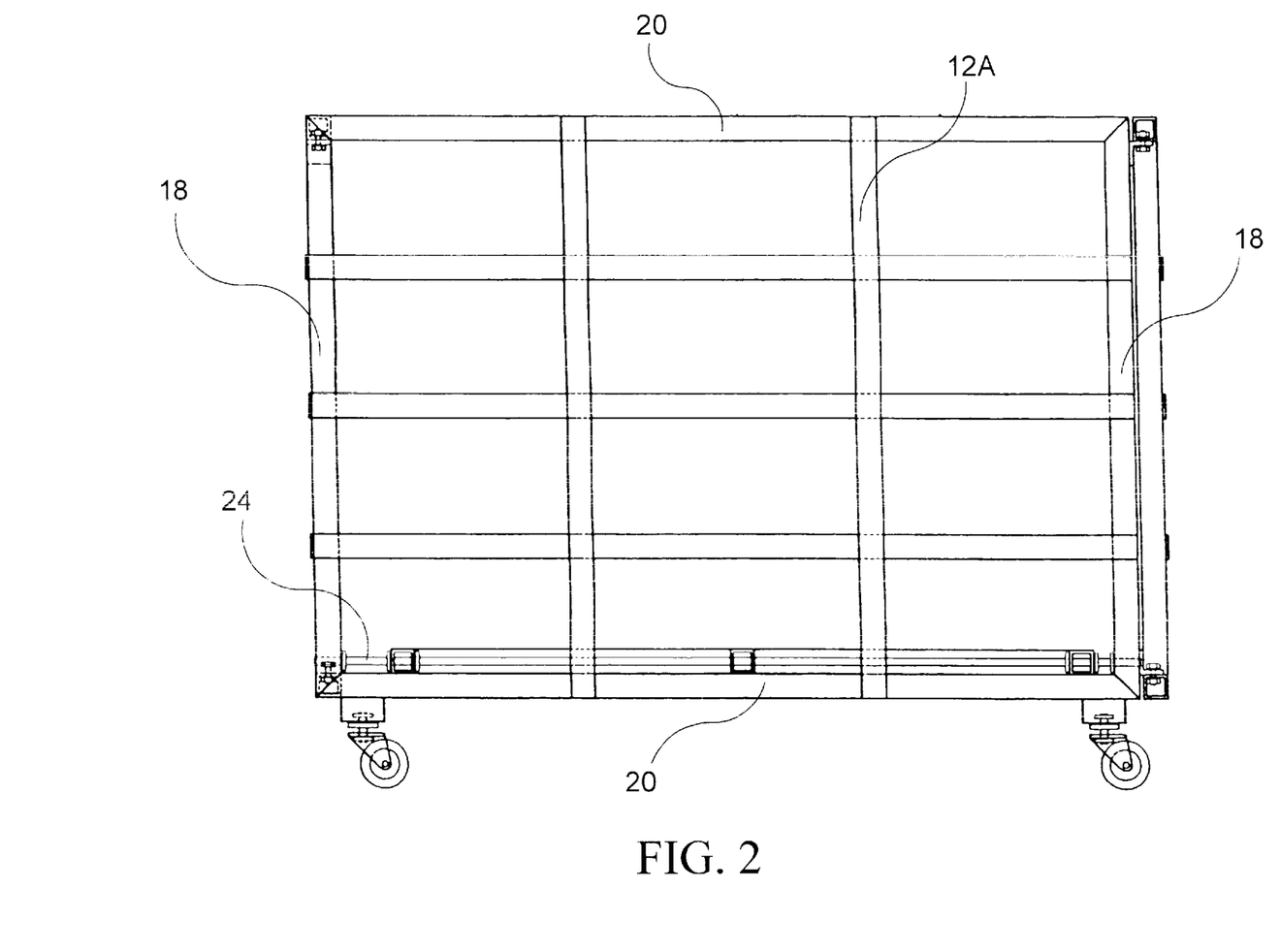
FIG. 2 is a front elevational view of a preferred embodiment of the cart of the subject invention.
Figure 3:
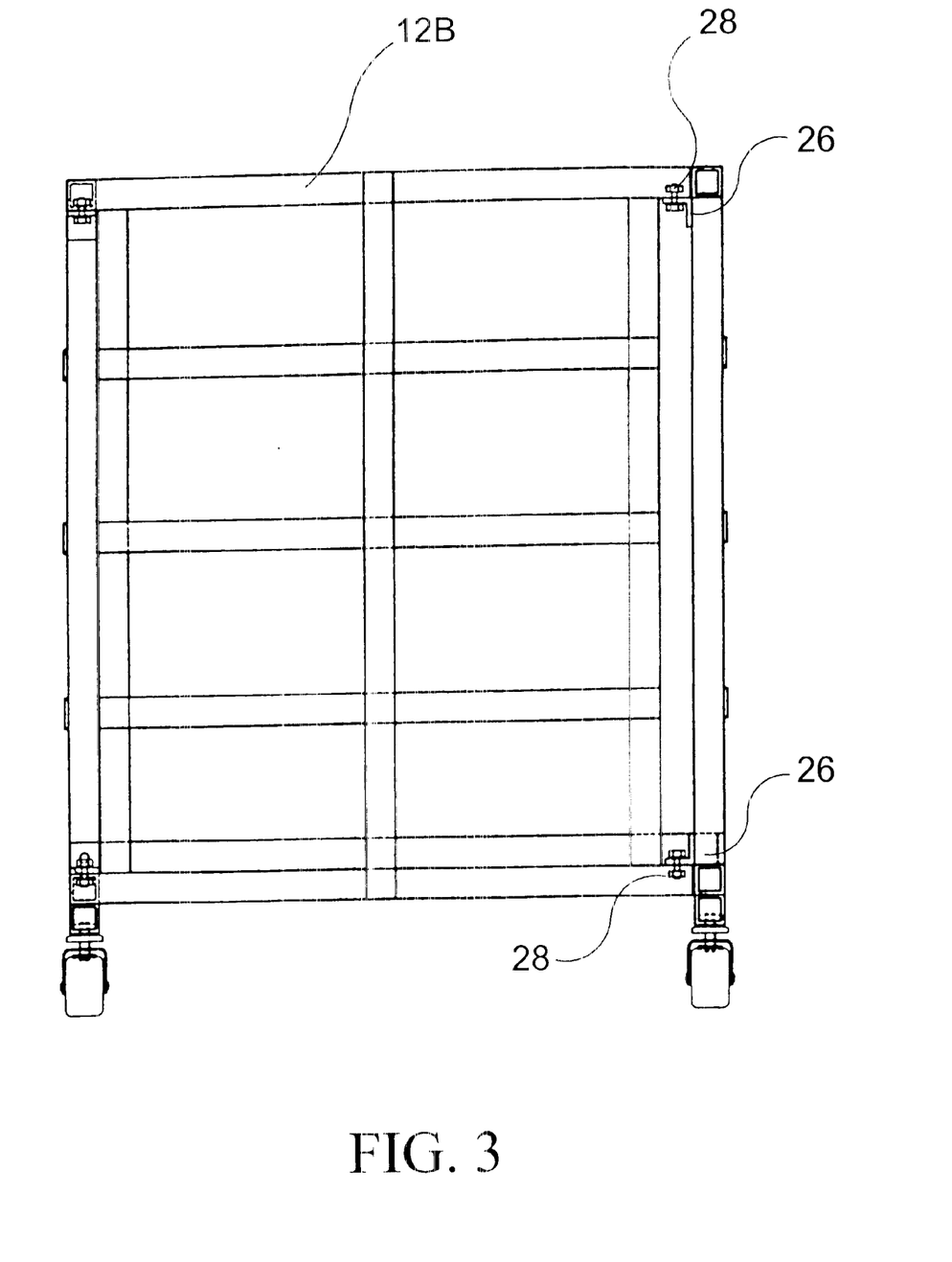
FIG. 3 is a side elevational view of a preferred embodiment of the cart of the subject invention.
Figure 6:
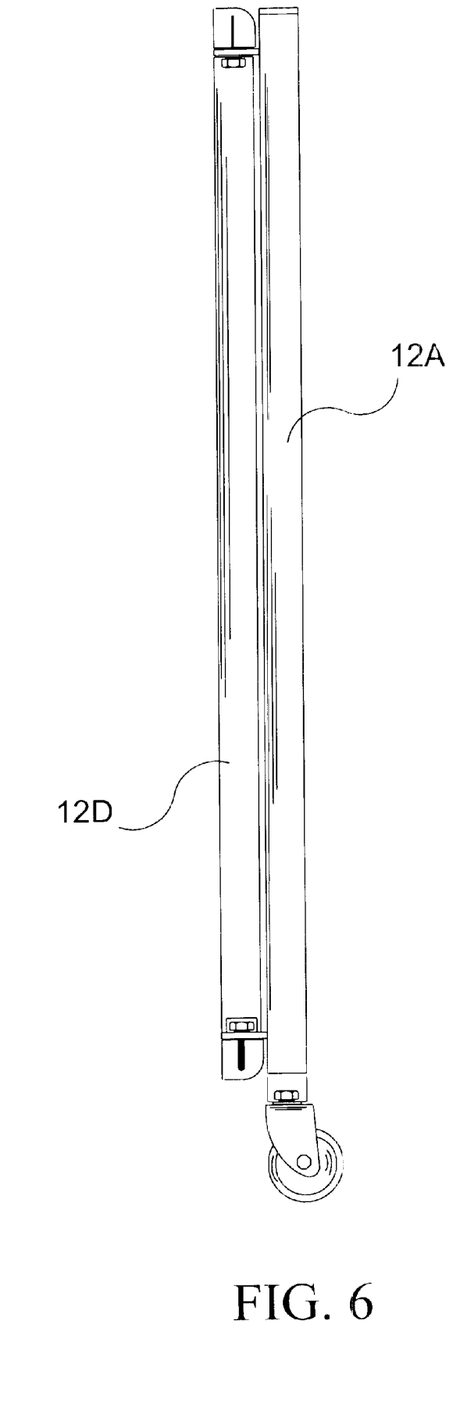
FIG. 6 is a side elevational view of a preferred embodiment of the cart of the subject invention fully collapsed.

In a preferred embodiment, the side panels 12 are defined by a frame having two vertical members 18 and two horizontal members 20. The frame defines a back and front of the side panel and has an interior, or inside, and periphery, or exterior. Each vertical member 18 is pivotally attached to a vertical member of another side panel. In this embodiment, the sides are attached to one another so they can offset as the cart is folded. This configuration is advantageous because it allows the cart to be collapsed so when folded it is only twice the thickness of the frame and occupies little space in a loaded truck. FIGS. 2 and 3 show how the side panels are attached in this particularly preferred embodiment. Long side panel 12a is pivotally attached to short side panels 12b and 12d. The short side panels are attached at one side on the periphery and at the other side on the back of the frame of the long side panel. FIG. 2 shows that short side panel 12b is pivotally attached to the exterior of the frame of long side panel 12a. FIG. 3 shows that short side panel 12d is pivotally attached to the back of long side panel 12a. Likewise, long side panel 12c is pivotally attached to short side panels 12b and 12d. Short side panel 12b is attached to long side panel 12c on the back of the frame while short side panel 12d is pivotally attached to long side panel 12c at the side of its frame. When folded, the side panels offset slightly. The folded cart is the length of a long side panel and a short side panel (FIG. 5) and the width of two frames (FIG. 6).

Figure 4:
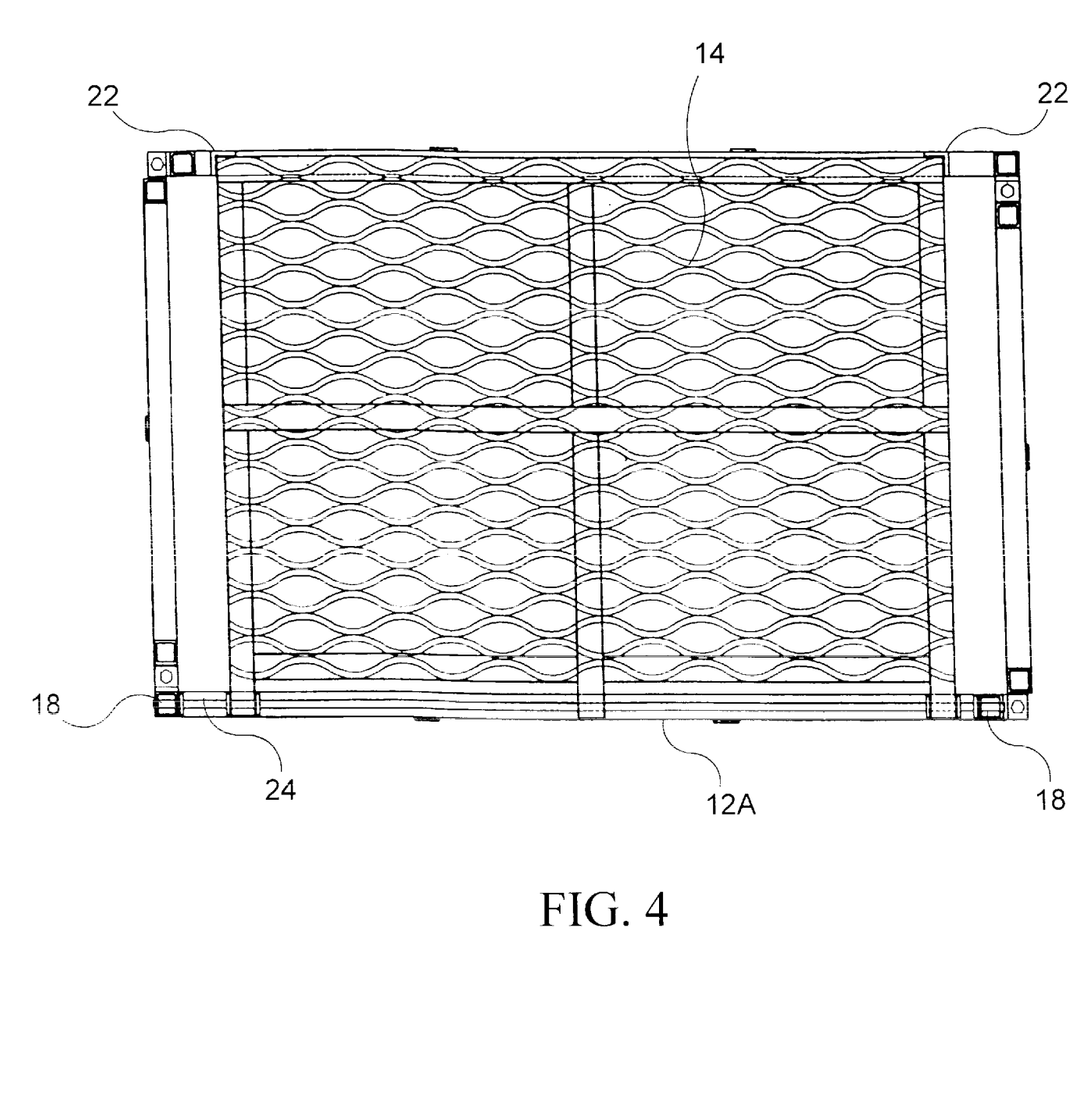
FIG. 4 is a top plan view of a preferred embodiment of the cart of the subject invention.
Figure 5:
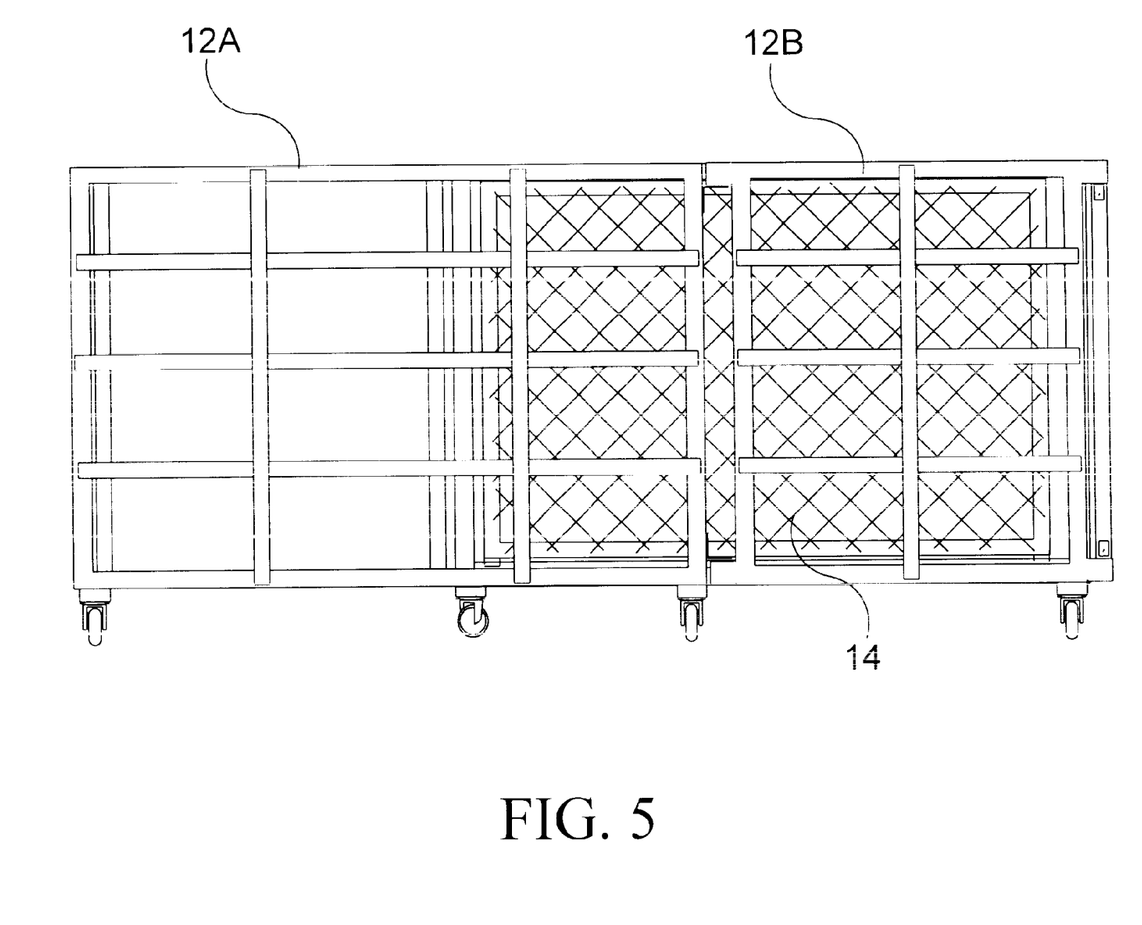
FIG. 5 is a front elevational view of a preferred embodiment of the cart of the subject invention fully collapsed.

In the exemplified embodiment, the floor panel 14 is pivotally attached to the inside of the vertical members 18 of the frame of long side panel 12a. The floor panel is slightly shorter than, and not as wide as, the side panel to which it is attached. The floor panel 14 therefore can be pivoted up and stored inside the frame of side panel 12a. When the cart is opened the floor panel 14 is in a horizontal position and the floor panel 14 of a preferred embodiment rests upon the horizontal member 20 of the frame of the opposing side panel. Referring to FIG. 4 the floor panel 14 is pivotally attached to long side panel 12a and in the open position is supported by the frame of opposing side panel 12c. This adds structure and strength to the cart. When the cart is unfolded and the floor panel 14 is dropped into place, it sets the cart in the open position preventing it from collapsing inadvertently. Bracketed guides 22 positioned on the inside of the frame prevent the floor panel from slipping.

Figure 7:
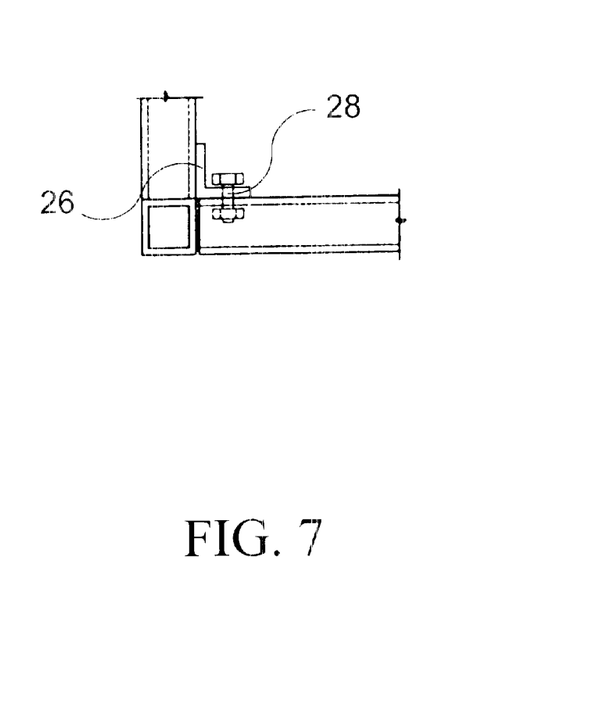
FIG. 7 is an enlarged cut-away side elevational view of a pin pivot of a preferred embodiment of the cart of the subject invention.

Each side panel of the cart of the subject invention is pivotally attached to two other side panels. Additionally, the floor panel is pivotally attached to one of the side panels. Pivots can be hinges or pin-type attachments. Butt or strap type hinges are suitable for use on the cart of the subject invention. The floor panel 14 can be pivotally attached to the inside of the frame of a side panel using a simple pin pivot. In a preferred embodiment, a single pin 24 runs from vertical member 18 through and along the length of the floor panel 14 into the vertical member 18 on the opposite side of the frame of the side panel. FIG. 4 shows the floor panel 14 can be attached to the inside of the frame. FIG. 7 shows a preferred pin pivot attachment for use in attaching the side panels of the collapsible cart of the subject invention to one another. The pivot comprises a bracket 26 and pin 28. Vertical 18 and horizontal 20 frame members of the exemplified embodiments are square tubes. Simple L-brackets 26 allow members to be joined by attaching, for example by welding, one leg of the L-bracket to the immoveable member and pivotally attaching the moveable member to the other leg of the L-bracket with a pin 28. Pins can be a threaded stem secured by nuts or a nut/bolt combination. FIG. 3 shows pin pivots attaching side panel 12c to side panel 12b at the upper and lower corner of the vertical members of each frame. Pin pivots are simple and effective, positioning them at the corners allows the side panels 12 to offset as the cart is collapsed. This arrangement however leaves gaps at the corners of the cart. If a tighter enclosure is desired to transport smaller items, side panels can be attached so the pivots run the distance of the side panel.

Floor and side panel configuration is dictated by the nature of the items to be transported and the weight of the load. Small items require a tighter enclosure so they are not dropped or lost during transport. Larger items, while not easily lost, require panels of suitable strength to contain and support the load. For example, cart panels of the exemplified embodiment are designed to contain items such as bundled linens, medium boxes and quart canisters. The panels of this preferred embodiment are constructed from heavy duty aluminum. The frames are one inch square tubular aluminum. Aluminum is strong enough to support and transport heavier loads yet is lightweight so that the cart is easy to handle and store. Side panels have a central post and three horizontal rails of ¼ inch thick aluminum welded onto the front of each frame. The rails are approximately four inches apart. As noted, this spacing is sufficient to contain loads of medium sized cargo. Smaller item may require a tighter enclosure and suitable side panel material may include a metal or fabric mesh. In some cases solid side panels may be desired. The floor panel of the exemplified embodiment is a metal mesh. The mesh is sturdy but lighter in weight than a solid metal floor. Other suitable panel materials would be apparent to those skilled in the art and include any combination or configuration of materials such as high and low density plastics, fabric meshes or various metals which provide adequate strength to contain and support a chosen load.

The cart of the subject invention can include accessory items such as wheels 16, a cover or a handle. The cart of the subject invention with no wheels is useful as a temporary storage bin in a warehouse or to organize a delivery truck. Wheels allow the cart to be used to transport items. Wheels can be roller or caster types. Casters swivel providing multidirectional movement. The placement of the wheels on the cart and the number of wheels used should be such as to provide maximum stability. In a preferred embodiment, a wheel 16 is placed under each corner of the open cart. The wheels 16 support the load evenly and each wheel is able to move freely.

Other accessories can include a cover or a handle. A cover is useful to contain items in the cart and allows carts to be stacked on one another. Additionally, a cover can add structure and strength to the cart in the same manner as the floor panel 14. Handles assist in moving the cart. Handles however may not be necessary. For example, in the embodiment shown in FIGS. 1–7, the rails provide a convenient grip.

Figure 8:
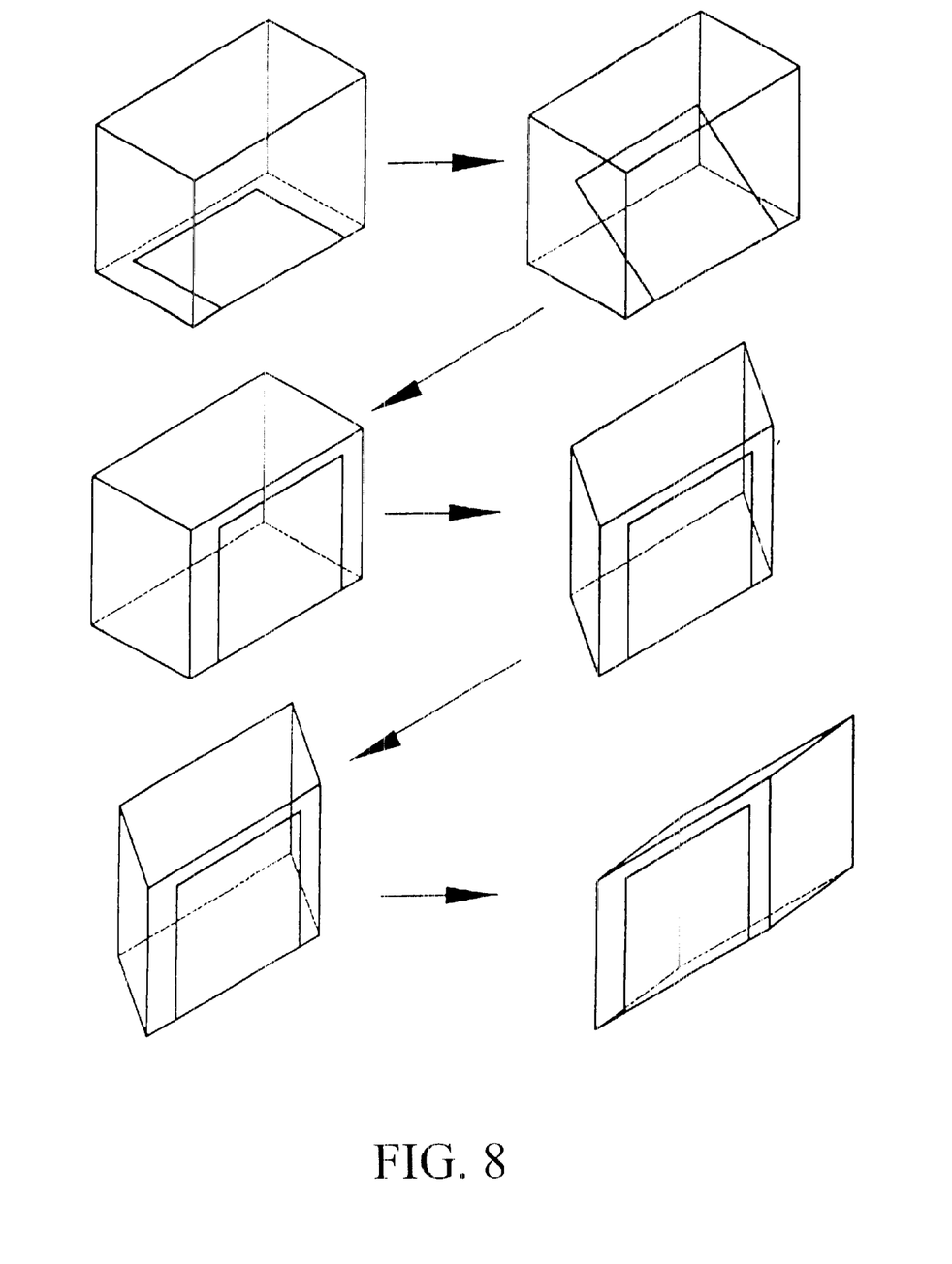
FIG. 8 is an operational view of the collapse of the cart of the subject invention.

The cart of the subject invention is easily collapsed to reduce its size for storage. FIG. 8 is an operative view of the collapse of the cart of the subject invention. The floor panel 14 of the cart is pivoted up and toward the side panel to which it is attached. Once the floor panel 14 is adjacent the side panel 12, opposing sides of the cart are pulled together to collapse the cart. The folded cart takes little space in a fully loaded truck. The cart is unfolded by separating the opposing side panels 12 and allowing the floor panel 14 to drop into position.

It is understood that the foregoing examples are merely illustrative of the present invention. Certain modifications of the compositions and/or methods employed may be made and still achieve the objectives of the inventions. Such modification are contemplated as within the scope of the claimed invention.

What is claimed is:

1. A collapsible cart comprising a floor panel and at least four side panels, said side panels comprising a frame, said frame defining a front, a back, an interior, and a periphery of said side panel, each said side panel being pivotally attached to one other side panel at its periphery and pivotally attached to another side panel at its back, said floor panel being pivotally attached to one side panel and said floor panel smaller in size than said periphery of said one side panel, said floor panel resting on said interior of a side panel opposing said one said panel, wherein said cart is collapsed by pivoting said floor panel toward said one side panel and moving said side panels toward one another.

2. The cart of claim 1, wherein said cart has four side panels.

3. The cart of claim 1, further comprising at least one wheel.

4. The cart of claim 1, further comprising four wheels.

5. The cart of claim 1, further comprising at least one handle.

6. A method of making a collapsible cart comprising the steps of:
   a) pivotally attaching at least two side panel to two other side panels; and
   b) pivotally attaching a floor panel to one of the side panels, wherein the cart is collapsed by pivoting the floor panel toward said one side panel to which it is attached and moving the other side panels toward one another.

7. The method of claim 6, further comprising attaching at least one wheel to said cart.

8. The method of claim 6, further comprising attaching four wheels to said cart.

9. The method of claim 6, further comprising attaching at least one handle to said cart.

10. A method of transporting goods comprising the steps of:
   a) placing said goods in a collapsible cart comprising a floor panel and at least four side panels, said side panels comprising a frame, said frame defining a front, a back, an interior, and a periphery of said side panel, each said side panel being pivotally attached to one other side panel at its periphery and pivotally attached to another side panel at its back, said floor panel being pivotally attached to one side panel and said floor panel smaller in size than said periphery of said one side panel, said floor panel resting on said interior of a side panel opposing said one said panel;
   b) moving said goods in said cart to a desired destination; and
   c) removing said good from said collapsible cart.

11. The method of claim 10, wherein said cart has four side panels.

12. The method of claim 10, wherein said cart further comprises at least one wheel.

13. The method of claim 10, wherein said cart further comprises four wheels.

14. The method of claim 10, wherein said cart further comprises at least one handle.

15. The method of claim 10, further comprising the steps of, before a), deploying the cart by separating said side panels and allowing the floor panel to drop into place.

16. The method of claim 10, further comprising the steps of, after c), collapsing the cart by pivoting said floor panel toward said one side panel and moving said side panels toward one another.

\* \* \* \* \*